(12) United States Patent
Endo (10) Patent No.: US 7,751,701 B2
(45) Date of Patent: Jul. 6, 2010

(54) IMAGING DEVICE PERFORMING FOCUS ADJUSTMENT BASED ON HUMAN FACE INFORMATION

(75) Inventor: Hiroshi Endo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 509 days.

(21) Appl. No.: 11/748,627

(22) Filed: May 15, 2007

(65) Prior Publication Data
US 2007/0280662 A1 Dec. 6, 2007

(30) Foreign Application Priority Data
Jun. 2, 2006 (JP) ............................. 2006-154242

(51) Int. Cl.
*G03B 13/34* (2006.01)
(52) U.S. Cl. ..................... 396/123; 348/347
(58) Field of Classification Search ................... 396/67, 396/123; 348/347
See application file for complete search history.

(56) References Cited

U.S. PATENT DOCUMENTS

| 5,666,566 A * | 9/1997 | Gu et al. ....................... 396/80 |
| 6,055,378 A * | 4/2000 | Oono et al. .................... 396/82 |
| 6,101,336 A * | 8/2000 | Nonaka ....................... 396/121 |
| 2004/0145672 A1* | 7/2004 | Sugimoto .................... 348/363 |
| 2004/0207743 A1* | 10/2004 | Nozaki et al. .......... 348/333.12 |
| 2005/0270410 A1* | 12/2005 | Takayama ................... 348/345 |
| 2007/0217776 A1* | 9/2007 | Torvinen ..................... 396/89 |

FOREIGN PATENT DOCUMENTS

JP       2006-18246 A      1/2006

* cited by examiner

*Primary Examiner*—Melissa J Koval
*Assistant Examiner*—Fang-Chi Chang
(74) *Attorney, Agent, or Firm*—Sughrue Mion, PLLC (57) ABSTRACT

A human face is detected from an image. On the basis of a size of the detected face and a focal length of a taking lens, a subject distance is calculated. Further, a depth of field is calculated on the basis of the calculated subject distance, the focal length of the taking lens and a stop diameter. The calculated depth of field is analyzed. When it is judged that the depth of field is deep, shooting is performed as it is. When it is judged that the depth of field is shallow, the stop diameter is reduced to deepen the depth of field. In addition, sensitivity of a CCD image sensor is heightened to correct brightness of the image.

11 Claims, 6 Drawing Sheets

IMAGING DEVICE PERFORMING FOCUS ADJUSTMENT BASED ON HUMAN FACE INFORMATION

FIELD OF THE INVENTION

The present invention relates to an imaging device in which focus adjustment is performed on the basis of information of a human face detected from an image.

BACKGROUND OF THE INVENTION

In an electronic camera and a video camera, focus adjustment is performed by using a contrast detection method in which a proper focus position is detected by analyzing an image signal, which is obtained by an image sensor for taking a subject, and a sharp image is discriminated on the basis of image contrast. As to the contrast detection method, since it is possible to use the image sensor as a detection element, cost is prevented from increasing. Further, since the sharpness of the image is discriminated, focus adjustment is accurately performed. On the other hand, it is necessary in the contrast detection method to analyze the image signal whenever a focus lens moves. Thus, there is a disadvantage in that it takes a time for detecting the focus position. In this regard, there is a known imaging device in which a required time for the focus adjustment is adapted to be shortened by narrowing a moving range of the focus lens in advance (see Japanese Patent Laid-Open Publication No. 2006-18246). In this imaging device, a human face of a subject is detected and a subject distance is estimated from a size of the human face. On the basis of the estimated subject distance, the moving range of the focus lens is narrowed in advance.

However, in the imaging device described in the above-noted Publication No. 2006-18246, the range for performing the focus adjustment of the contrast detection method is merely reduced in comparison with a conventional range. Thus, there is a disadvantage in that the required time for the focus adjustment is not sufficiently shortened. Moreover, a depth of field is calculated, and the focus adjustment is not performed when a main subject is located inside the depth of field. Although the time is shortened by doing so, the focus adjustment of the contrast detection method is performed when the main subject is located outside the depth of field. Consequently, there is a disadvantage in that the time can be shortened in only the specific case.

SUMMARY OF THE INVENTION

In view of the foregoing, it is a primary object of the present invention to provide an imaging device in which a time of focus adjustment is adapted to be shorter than a conventional time without performing focus adjustment of the contrast detection method.

In order to achieve the above and other objects, the imaging device according to the present invention comprises an image sensor, a taking lens, a face detector, a subject-distance calculator, a focus adjuster, a depth-of-field calculator, a depth-of-field analyzer and a depth-of-field adjuster. The image sensor takes a subject. The taking lens is disposed at a subject side of the image sensor to form a subject image on the image sensor. The taking lens has a stop and a focus lens. The stop regulates a subject-light amount. The focus lens is used for adjusting the focus. Further, the taking lens includes a zoom lens capable of changing a focal length. The face detector detects a human face from the subject image. The subject-distance calculator calculates a subject distance on the basis of the focal length of the taking lens and a size of the human face detected by the face detector. The focus adjuster moves the focus lens in accordance with the subject distance. The depth-of-field calculator calculates a depth of field on the basis of the focal length of the taking lens, a dimension of the stop and the subject distance. The depth-of-field analyzer judges whether or not a calculated value of the depth of field has a predetermined depth. The depth-of-field adjuster reduces the stop to deepen the depth of field when it has been judged that the calculated value does not have the predetermined depth.

It is preferable that the imaging device further comprises a second subject-distance calculator and a distance analyzer. The second subject-distance calculator calculates a second subject distance by triangular ranging. In this case, the subject distance calculated on the basis of the size of the human face is referred to as first subject distance. The distance analyzer judges whether or not a difference between the first and second subject distances is within a predetermined range. When it has been judged that the difference of the subject distances is within the predetermined range, the focus adjuster performs the focus adjustment in accordance with the first subject distance. When it has been judged that the difference of the subject distances is outside the predetermined range, the focus adjuster performs the focus adjustment in accordance with the second subject distance.

Moreover, it is preferable to further comprise a sensitivity adjuster, which heightens the sensitivity of the image sensor when the stop is reduced by the depth-of-field adjuster.

Further, it is preferable that the focus adjuster moves the focus lens in accordance with a change of the subject distance while a moving image is recorded and while still images are recorded during a single shooting operation.

According to the present invention, the subject distance is calculated on the basis of the face size of the human subject, and the focus adjustment is performed on the basis of the calculated subject distance. At this time, when the depth of field calculated on the basis of the calculated subject distance and the dimension of the stop is shallow, the stop is reduced to deepen the depth of field. Thus, even in some cases that the subject distance calculated from the face size has an error, the focal length of the lens is greatly changed due to environment temperature, and the lens position has a control error, the focus lens is moved to a position where the main subject is located within the depth of field, so that the shooting is performed in a proper focus state. By the present invention, it is possible to shorten the period required for the focus adjustment in comparison with a case in that focus adjustment is performed by a contrast detection method carrying out search drive of the focus lens.

DESCRIPTION OF THE PREFERRED EMBODIMENTS

Figure 1:
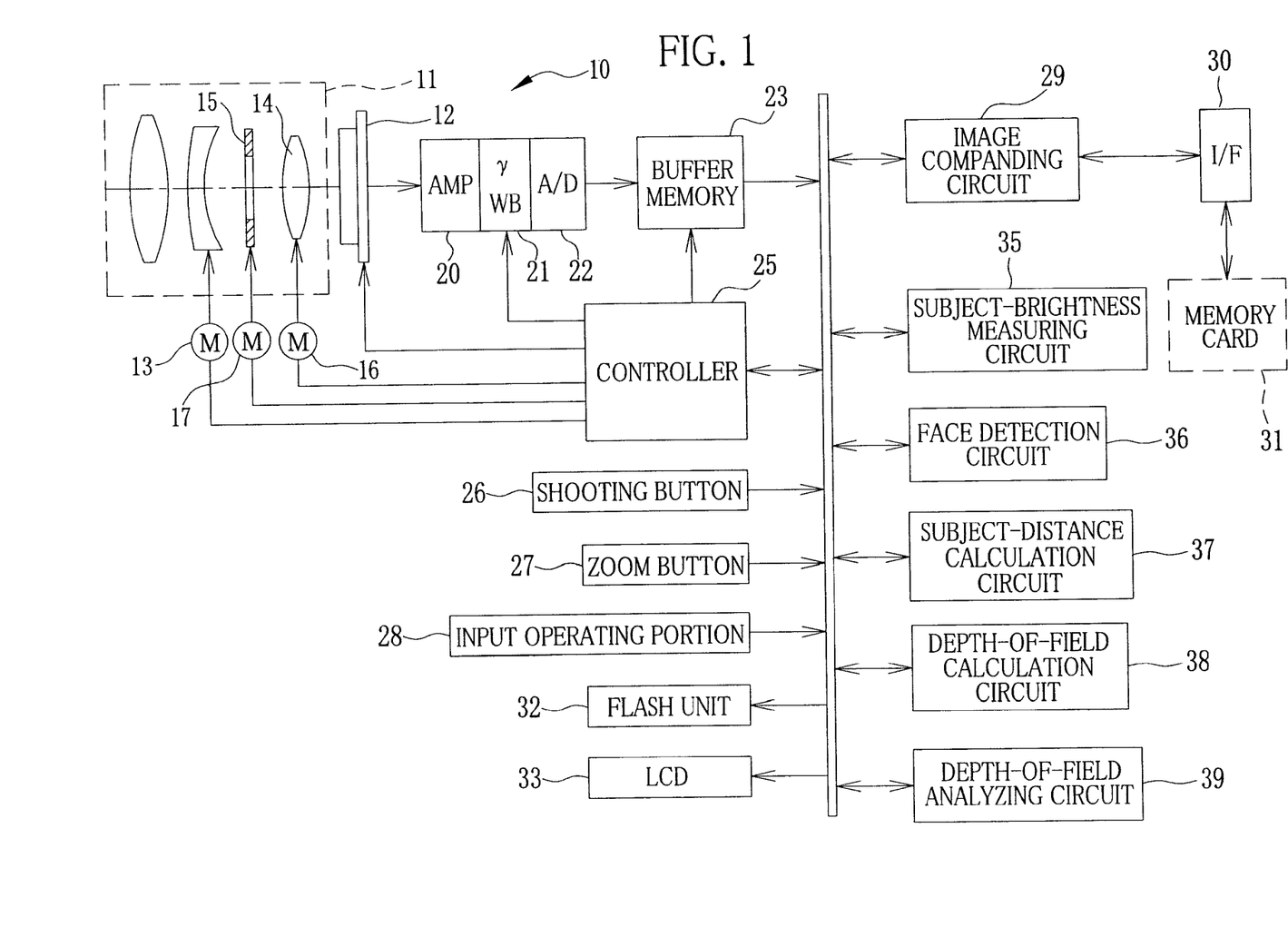
FIG. 1 is a block diagram showing a schematic structure of an electronic camera.

In FIG. 1, an electronic camera 10 comprises a taking lens 11 including a zoom lens, and a CCD image sensor 12 for converting a subject image, which is formed by the taking lens 11, into an image signal. The taking lens 11 includes a lens which is moved by a drive force of a zoom motor 13 in an optical axis-direction at a time when a zoom magnification is changed. The taking lens 11 further includes a focus lens 14 moving in the optical-axis direction at a time of focus adjustment, and a variable stop 15 capable of regulating an aperture diameter. The focus lens 14 is moved in the optical-axis direction by a drive force transmitted from a focus motor 16. The variable stop 15 is capable of continuously changing the aperture size by an iris motor 17 to regulate a subject-light amount entering the taking lens 11. Further, the variable stop 15 is actuated when a depth of field is adjusted.

The CCD image sensor 12 detects an optical subject image as a signal charge of each pixel and reads the detected signal charge to produce an analog image signal. An amplifier 20 amplifies the image signal outputted from the CCD image sensor 12. A gain of the amplifier 20 is regulated to adjust brightness of the whole image. By regulating the gain, sensitivity of the CCD image sensor 12 is adjusted. The image signal amplified by the amplifier 20 is sent to an image-quality correction circuit 21 for performing image-quality correction processing of gamma correction, white-balance adjustment, noise removal and so forth. An AD converter 22 digitally converts the analog image signal for which the image-quality correction processing has been performed. A buffer memory 23 temporarily stores the digitally converted image signal as image data.

A controller 25 includes a memory, a CPU, a driver circuit and a clock generator to electrically control the respective parts of the electronic camera 10. The memory stores a control program of the electronic camera 10. The CPU executes the control program. The driver circuit actuates the focus motor 16 and the iris motor 17. The clock generator produces clock pulses for activating the CCD image sensor 12. A shooting button 26 is handled in performing still-image shooting and in commencing and terminating moving-image shooting. A zoom button 27 is handled in changing the zoom magnification of the taking lens 11 to perform optical zooming in which shooting magnification is changed by altering a focal length of the taking lens 11. An input operating portion 28 is composed of plural kinds of input keys used at times when setting of the electronic camera 10 is changed, shooting and reproduction are switched, and an image to be reproduced is selected.

In taking the still image and the moving image, an image companding circuit 29 compresses the image data in a format respectively determined therefor. Further, the image companding circuit 29 expands the compressed image data in reading the recorded image data to convert the image data into reproducible data. A memory-card interface 30 performs a control for recording the image data in a memory card 31 removably attached to the electronic camera 10. In addition, the memory-card interface 30 performs a control for reading the image data recorded in the memory card 31.

A flash unit 32 emits a flashlight to compensate a light amount of a subject when subject brightness is low. A liquid crystal display 33 is used as an electronic viewfinder for displaying the subject image, which is converted into the image signal by the CCD image sensor 12, as a confirmation image of a shooting area. Further, the liquid crystal display 33 reproduces the image data recorded in the memory card 31.

On the basis of the image data stored in the buffer memory 23, a subject-brightness measuring circuit 35 measures average brightness of an entire image or of a partial image as the subject brightness. The aperture diameter of the variable stop 15 is determined on the basis of the measured subject brightness. When it is impossible to adjust the subject-light amount by means of the variable stop 15 due to high brightness and low brightness, the brightness of the image is adjusted by regulating the gain of the amplifier 20.

Figure 2:
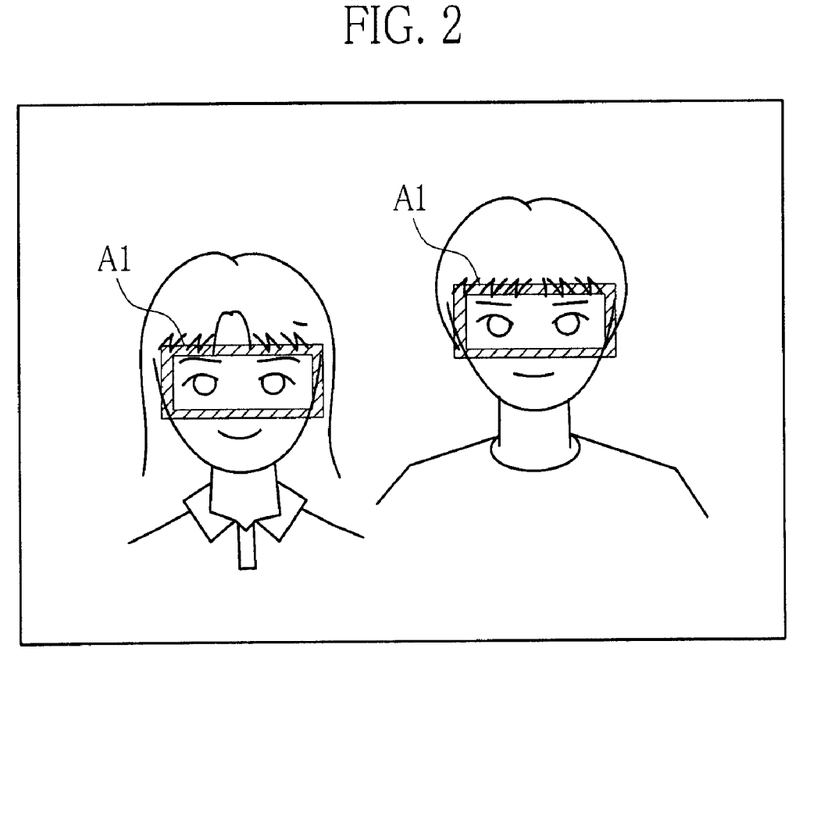
FIG. 2 is an explanatory illustration showing an area of both eyes of a person detected from an image.

A face detection circuit 36 detects a face of a human subject from an image obtained at a shooting time to calculate a ratio of a face size to a picture size. As shown in FIG. 2, for example, a region A1 wherein human eyes reside is identified in detecting the human face. By detecting the human eyes, human existence is judged. After identifying the region of the human eyes, a contour of the face is identified on the basis of colors of skin and hair, and a positional relationship thereof. Then, the face size is obtained on the basis of an area of a flesh-colored region. Meanwhile, in obtaining the face size, an interval of both eyes may be measured and the face size may be determined on the basis of the measured interval of both eyes. The taking lens 11 is designed so as to make a circle of confusion comparatively small on the whole range of a focus-adjustable subject distance. In virtue of this, it is possible to detect the face even in a state that the focus adjustment is not performed.

A subject-distance calculation circuit 37 calculates a distance, which extends to a person, as a subject distance on the basis of a focal length of the taking lens 11 and the size of the human face. For example, even though a person is in the same position, the face size changes as the zoom magnification of the taking lens 11 changes. The subject-distance calculation circuit 37 calculates the subject distance corresponding to the focal length of the taking lens 11 and the size of the human face.

Figure 3:
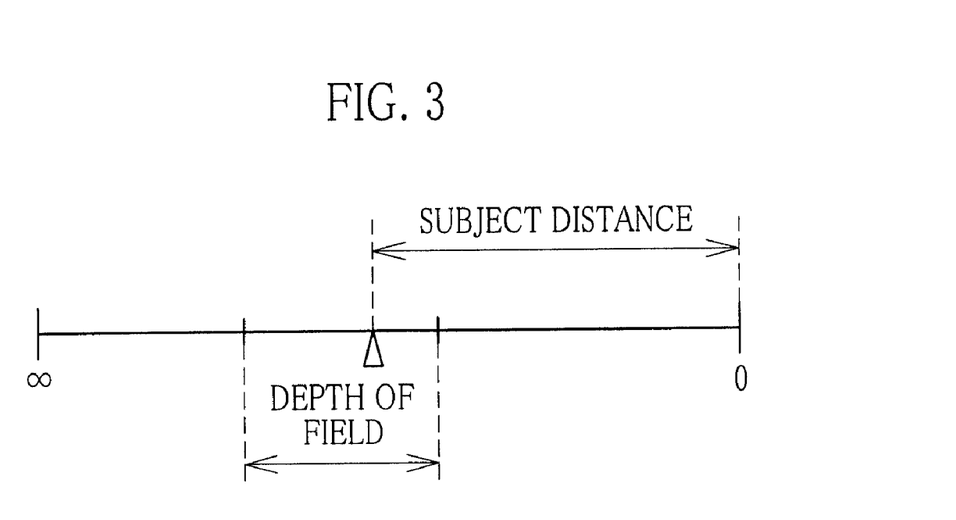
FIG. 3 is an explanatory illustration showing a depth of field.

A depth-of-field calculation circuit 38 calculates a depth of field on the basis of three factors of the calculated subject distance, the focal length of the taking lens 11, and the size of the aperture diameter of the variable stop 15. When the focus is adjusted to a position of the calculated subject distance, the depth of field is an anteroposterior extent of the focus position based on the subject-distance position, such as shown in FIG. 3. As well known, relative to the subject of the same position, the depth of field becomes shallower as the focal length of the taking lens 11 is longer and as the aperture diameter of the variable stop 15 is larger. Further, the depth of field becomes shallower as the subject distance becomes shorter.

A depth-of-field analyzing circuit 39 analyzes whether the calculated depth of field is deeper or shallower in comparison with a predetermined reference value. This reference value used for the analysis is different in accordance with the focal length of the taking lens 11, for example. By analyzing the depth of field, it is possible to judge whether accuracy necessary for the focus adjustment is high or low. When the correct focus adjustment is difficult due to a change of the focal length, which is caused by movement error and temperature properties of the focus lens 14, and measurement error of the subject distance, it is impossible to record an image having high sharpness if the accuracy necessary for the focus adjustment is high. In other words, accurate focus adjustment is necessary when the depth of field is shallow. For this reason, the analysis is performed for the purpose of deepening the depth of field and lowering the focus accuracy.

Figure 4:
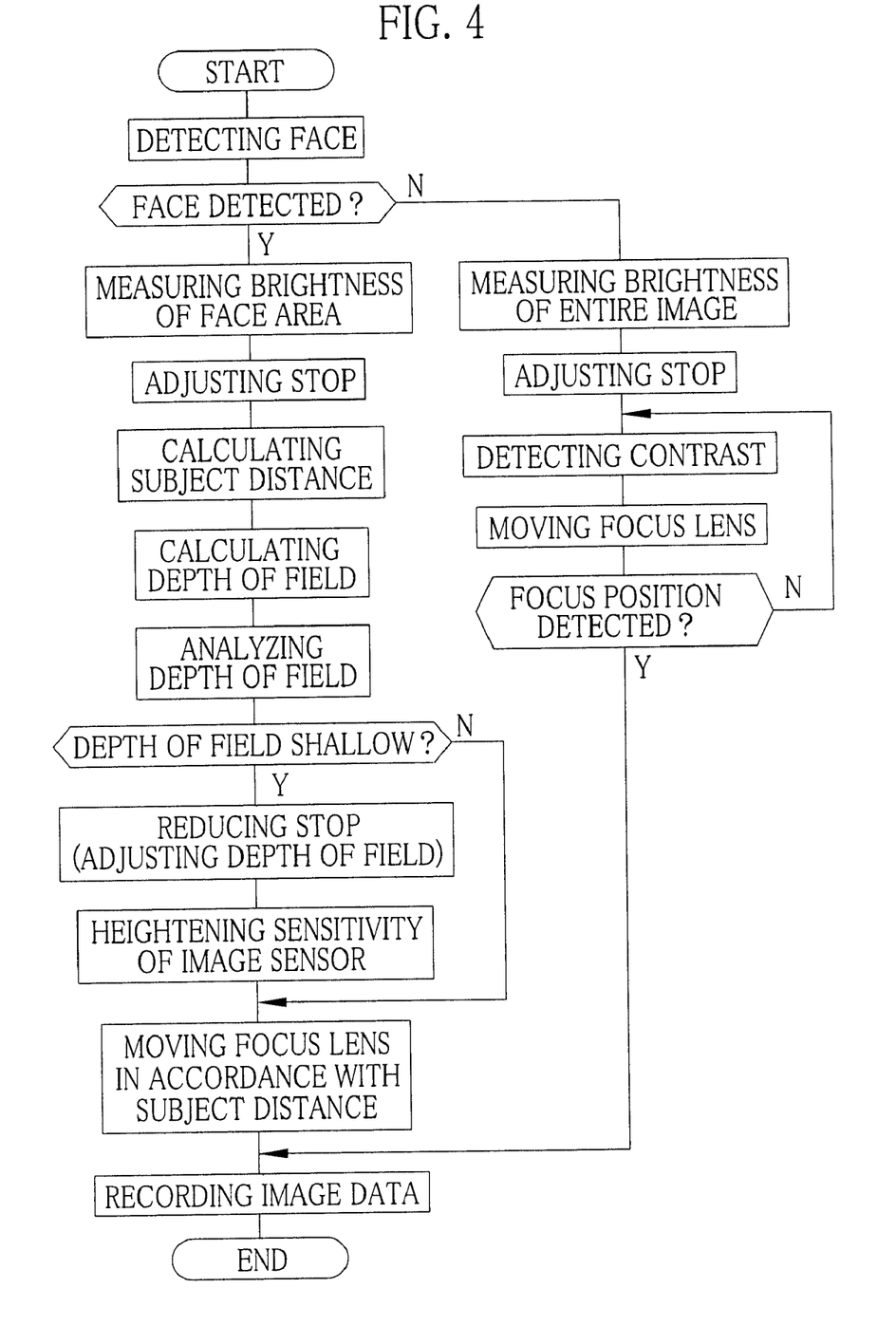
FIG. 4 is a flowchart showing an operation of the electronic camera.

Next, an operation of the electronic camera 10 is described below with reference to FIG. 4. When a shooting mode of the electronic camera 10 is executed, the CCD image sensor 12 is activated and the taken subject image is shown on the liquid crystal display 33. Upon handling of the shooting button 26, a preparation operation for shooting is executed, and then the image is recorded.

In the shooting preparation operation, the human face is detected and the stop is adjusted on the basis of the subject brightness. Further, the focus adjustment is performed on the basis of the face detection. The face detection circuit 36 detects the human eyes from the image to judge existence of a person. When the human eyes are detected from the image, the area of the human face is calculated to obtain the ratio of the face area to the entire image.

The subject-brightness measuring circuit 35 derives the image data of the face region detected by the face detection circuit 36 to measure the brightness of the face region as the subject brightness. A measured value of the subject brightness is sent to the controller 25. On the basis of the measured value of the subject brightness, the controller 25 determines the aperture diameter of the variable stop 15 and drives the iris motor 17.

In the meantime, when the face detection circuit 36 has not detected a person, the subject brightness is measured from the brightness of the entire image to determine the aperture diameter of the variable stop 15. In addition, the contrast of the image is detected to find the focus position, and the focus lens 14 is moved so as to obtain the image having the highest contrast.

After detecting the human face by the face detection circuit 36, the subject-distance calculation circuit 37 calculates the subject distance from the size of the human face and the focal length of the taking lens 11. The depth-of-field calculation circuit 38 calculates the depth of field from the calculated subject distance, the focal length of the taking lens 11, and the aperture diameter (f-number) of the variable stop 15. The depth-of-field analyzing circuit 39 compares the calculated depth of field with the reference value to analyze the depth of field.

When it is judged by the depth-of-field analyzing circuit 39 that the depth of field is deep, the controller 25 drives the focus motor 16 on the basis of the subject distance, which is calculated from the face size, to move the focus lens 14. After moving the focus lens 14, the shooting preparation operation terminates, and then, recording of the image is performed.

When it is judged by the depth-of-field analyzing circuit 39 that the depth of field is shallow, the controller 25 calculates the aperture diameter of the variable stop 15 necessary for obtaining the depth of field satisfying the reference value used for analysis. Concretely, the aperture diameter is determined so as to set the depth of field to the reference value or more. The aperture diameter calculated at this time is smaller than the aperture diameter determined in accordance with the subject brightness. The controller 25 drives the iris motor 17 to reduce the aperture diameter of the variable stop 15.

By reducing the aperture diameter of the variable stop 15, the depth of field becomes deep and the subject-light amount entering the CCD image sensor 12 decreases. The controller 25 increases the gain of the amplifier 20 in accordance with the change of the aperture diameter of the variable stop 15 to heighten the sensitivity of the CCD image sensor 12. In virtue of this, a decline of the image brightness caused by the decrease of the subject-light amount is compensated. The controller 25 drives the focus motor 16 on the basis of the subject distance calculated from the face size to move the focus lens 14.

After the depth of field and the focus have been adjusted in accordance with the change of the stop diameter, the subject is taken by the CCD image sensor 12 and the image data is recorded in the memory card 31. The recorded image is a sharp image for which the proper focus adjustment is performed so as to position the main subject inside the depth of field. At the same time, the recorded image is an image of which brightness is properly adjusted by the sensitivity adjustment.

Figure 5:
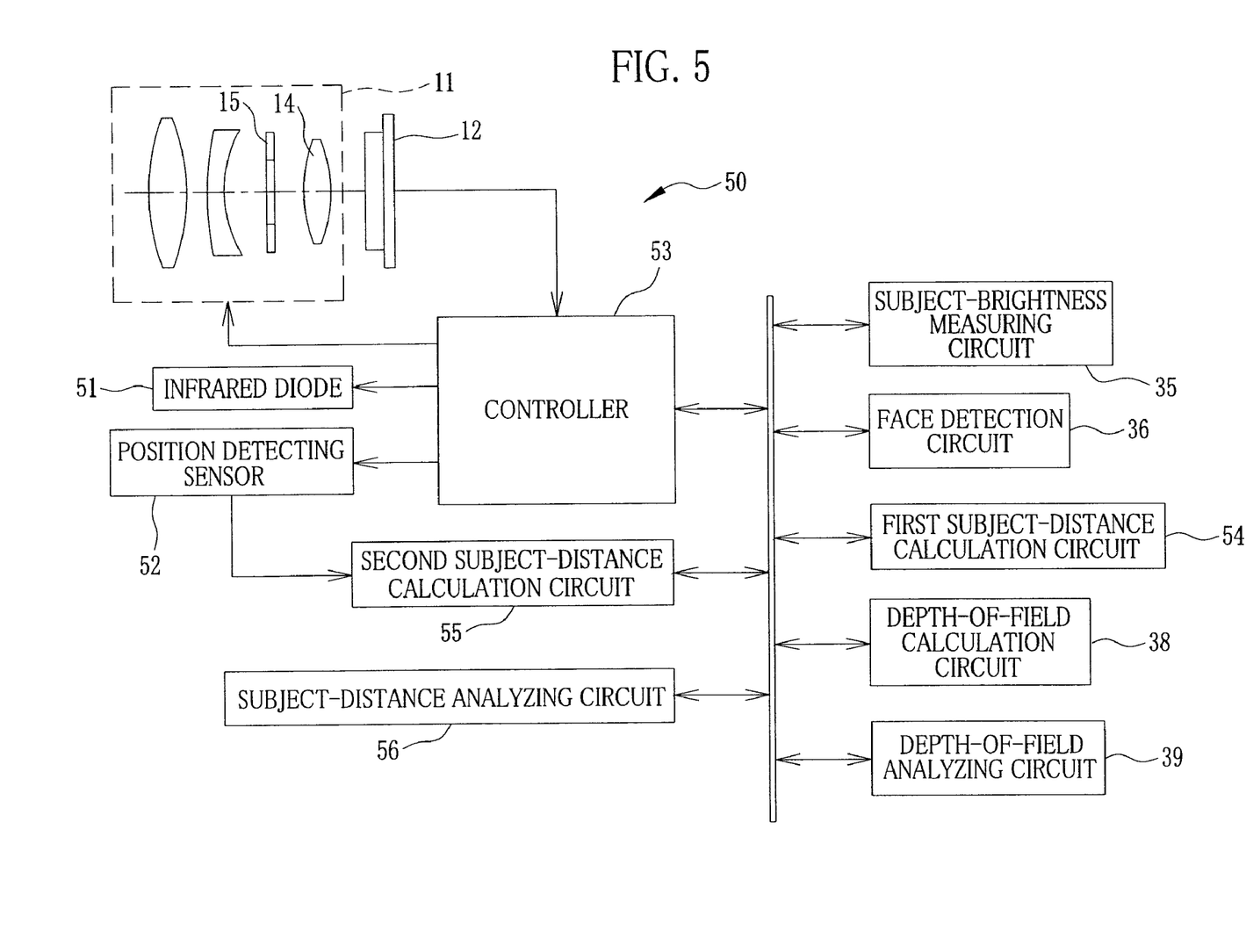
FIG. 5 is a block diagram showing a schematic structure of the electronic camera of the second embodiment.

Next, the second embodiment is described below. In FIG. 5, an electronic camera 50 comprises an infrared diode 51 and a position detecting sensor 52. The infrared diode 51 emits the infrared rays toward a subject. The position detecting sensor 52 receives the infrared ray reflected by the subject to detect a light reception position of the infrared ray. The infrared diode 51 and the position detecting sensor 52 are controlled by a controller 53.

The electronic camera 50 includes first and second subject-distance calculation circuits 54 and 55. The first subject-distance calculation circuit 54 calculates a first subject distance on the basis of the size of the human face detected from the taken image. The second subject-distance calculation circuit 55 calculates a second subject distance by triangular ranging based on the light reception position detected by the position detecting sensor 52. The first subject-distance calculation circuit 54 is identical with the subject-distance calculation circuit 37 of the electronic camera 10.

A subject-distance analyzing circuit 56 compares the first and second subject distances to analyze whether or not a difference between these two distances is smaller than a reference value. In this regard, for example, an allowable range of the difference of the two subject distances is one percent or less of the subject distance. Alternatively, the allowable range may be determined by finding a circle of confusion at a time when the second subject distance is focused on condition that the first subject distance is the focus position and by making the circle of confusion two times or less of a pixel pitch of the CCD image sensor 12.

Figure 6:
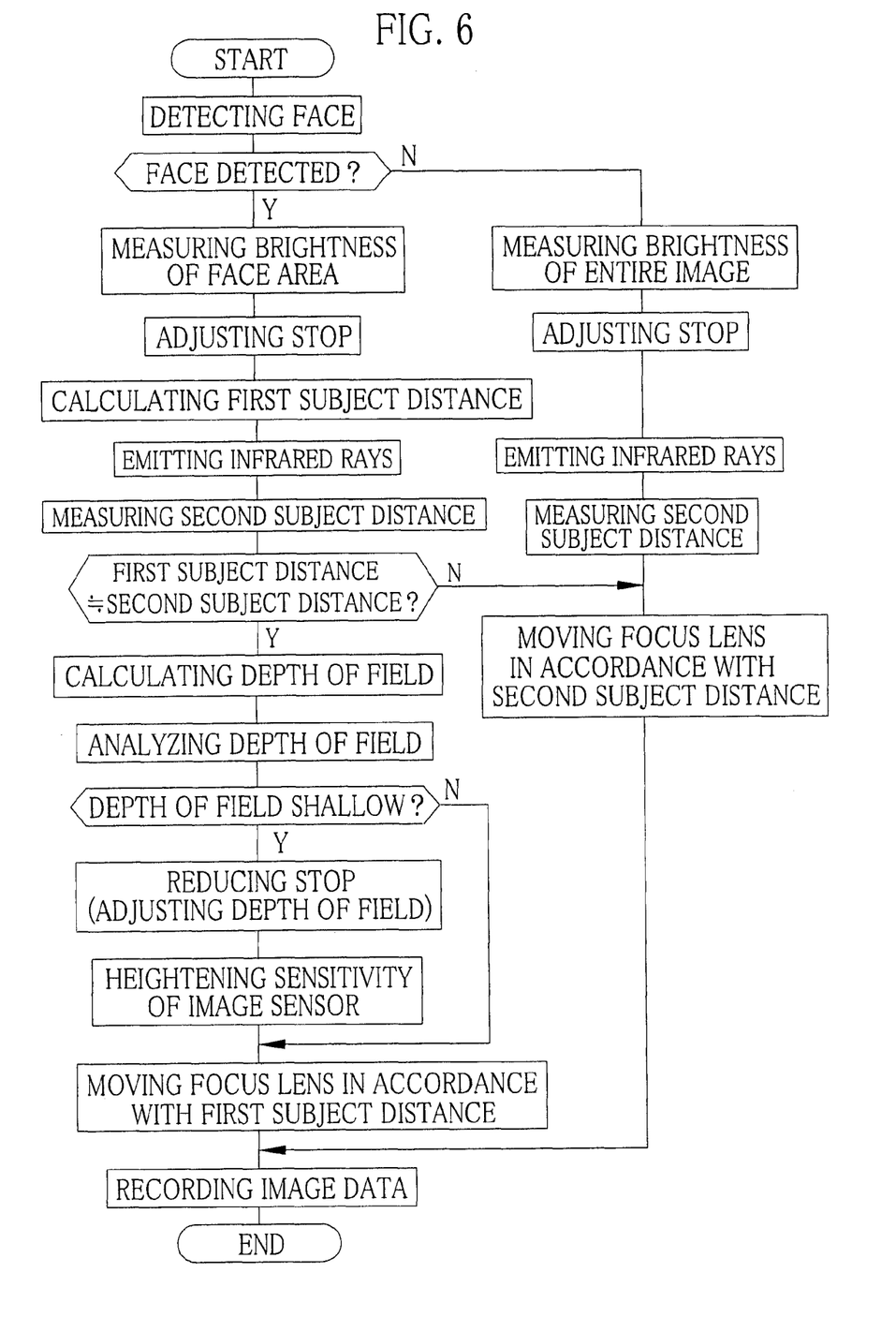
FIG. 6 is a flowchart showing an operation of the electronic camera of the second embodiment.

Successively, an operation of the electronic camera 50 is described below. In FIG. 6, the electronic camera 50 performs the face detection by the face detection circuit 36 at the moment of the shooting operation to judge whether or not a person exists in the image. When there is no person in the image, the subject-brightness measuring circuit 35 calculates average brightness of the entire image as the subject brightness. The infrared diode 51 emits the infrared rays and the position detecting circuit 52 detects the infrared rays reflected by the subject. The second subject-distance calculation circuit 55 calculates the second subject distance.

When there is a person, the face detection circuit 36 calculates a face size. The subject-brightness measuring circuit 35 calculates face brightness as the subject brightness. The first subject-distance calculation circuit 54 calculates the first subject distance on the basis of the face size. The infrared diode 51 emits the infrared rays and the position detecting circuit 52 detects the infrared rays reflected by the subject. The second subject-distance calculation circuit 55 calculates the second subject distance. The subject-distance analyzing circuit 56 compares the first and second subject distances and compares a difference thereof with the reference value. When it is judged that the difference between the first and second subject distances is large, it is considered that the human face is not correctly detected or that the main subject is not a person. In this case, the focus adjustment is performed on the basis of the second subject distance obtained by the triangular ranging, and recording of the image is performed.

When it is judged that the difference between the first and second subject distances is small, it is considered that a person regarded as a main subject is correctly detected from the image. The depth-of-field calculation circuit 38 calculates the depth of field, and the depth-of-field analyzing circuit 39 analyzes the calculated depth of field. When it is judged that the depth of field is deep, the focus lens 14 is moved to the focus position based on the first subject distance, and recording of the image is performed.

When it is judged that the depth of field is shallow, the aperture diameter of the variable stop 15 is reduced to deepen the depth of field. Further, the sensitivity of the CCD image sensor 12 is heightened to compensate the image brightness in accordance with the subject-light amount lowered due to the reduction of the stop diameter. The focus lens 14 is moved to the focus position based on the first subject distance, and after that, recording of the image is performed.

As described above, in the electronic camera 50, the brightness adjustment and the focus adjustment are properly performed so that it is possible to obtain an image in which the main subject is sharply recorded.

In the above-described electronic camera 50, the infrared ray is emitted toward the subject and the light reception position of the reflected infrared ray is detected to measure the second subject distance. In other words, active ranging is performed. Besides this, passive ranging may be performed with two sensors provided for receiving the subject light in order to utilize the subject light as the information light. In the passive ranging, the second subject distance is measured by obtaining contrast difference (phase difference) of the subject lights detected by the respective sensors on condition that a distance between the two sensors is a base length.

Figure 7:
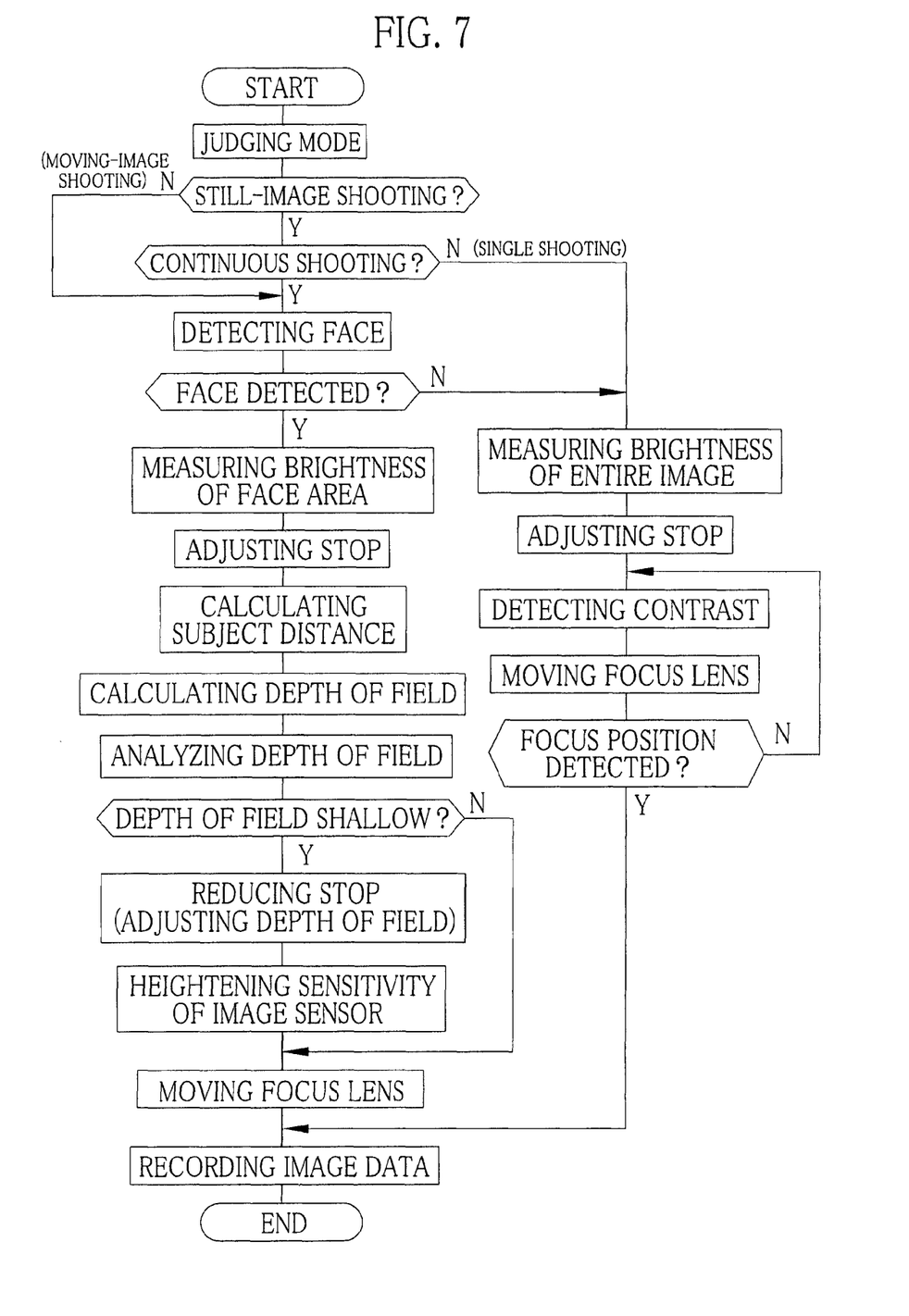
FIG. 7 is a flowchart showing an operation of the electronic camera of the third embodiment.

In the above embodiments, a single still image is recorded. In the present invention, as shown in FIG. 7, the focus adjustment based on the conventional contrast detecting method may be performed when single shooting for recording a single still image is carried out, and the rapid focus adjustment based on the subject distance obtained by the face detection may be performed only when moving-image shooting or continuous shooting is carried out relative to a mobile subject. In this case, it is possible to prevent continuously-taken images from including an image for which inadequate focus adjustment is performed. Moreover, in taking a moving image, it is unnecessary to consistently wobble the lens for the purpose of monitoring a change of the focus position. Thus, it is possible to save an electric power to be used for moving the lens.

The aperture diameter of the variable stop 15 is reduced to deepen the depth of field. At this time, when the subject-light amount greatly decreases, the depth of field may be deepened by changing the zoom magnification to a wide-angle side wherein the focal length of the lens is shortened. When a predetermined depth of field is not obtained by changing the focal length of the lens and the stop diameter, a moving range of the focus lens may be restricted in advance on the basis of the subject distance obtained by the face detection. In this case, the focus lens is moved within the restricted range to perform the focus adjustment based on the contrast detecting method.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An imaging device comprising:
   an image sensor for taking a subject;
   a taking lens disposed at a subject side of said image sensor to form a subject image on said image sensor, said taking lens having a stop for regulating a subject-light amount and a focus lens used for focus adjustment, and said taking lens including a zoom lens capable of changing a focal length;
   a face detector for detecting a human face from said subject image;
   a subject-brightness measuring device for measuring the brightness of a region of the human face detected by said face detector as subject brightness;
   a first subject-distance calculator for calculating a first subject distance on the basis of the focal length of said taking lens and a size of the human face detected by said face detector;
   a depth-of-field calculator for calculating a depth of field on the basis of the focal length of said taking lens, a dimension of said stop and said first subject distance;
   a depth-of-field analyzer for judging whether or not a calculated value of said depth of field has a predetermined depth; and
   a controller for moving said focus lens based on said first subject distance with maintaining said dimension of said stop and sensitivity of said image sensor when it has been judged that the calculated value has the predetermined depth, and for making said dimension of said stop smaller than that corresponding to said subject brightness, heightening said sensitivity of said image sensor in accordance with the change in said dimension of said stop, and moving said focus lens based on said first subject distance when it has been judged that the calculated value does not have the predetermined depth.

2. The imaging device according to claim 1, wherein said controller heightens the sensitivity of said image sensor by increasing a gain of an amplifier amplifying an image signal outputted from said image sensor.

3. The imaging device according to claim 1, wherein said controller moves said focus lens in accordance with a change of said subject distance while a moving image is recorded and while still images are recorded during a single shooting operation.

4. The imaging device according to claim 3, wherein said controller moves said focus lens by activating a motor for transmitting a drive force to said focus lens.

5. The imaging device according to claim 1, wherein said face detector detects the human face by detecting both eyes of a person.

6. The imaging device according to claim 5, wherein the size of said human face is obtained from an area of a flesh-colored region within which said eyes reside.

7. The imaging device according to claim 5, wherein the size of said human face is obtained from a measured interval of said eyes.

8. The imaging device according to claim 1, wherein said depth-of-field analyzer compares said depth of field with a predetermined reference value to judge whether or not the calculated value has the predetermined depth, and said controller determines an aperture diameter of the stop so as to set said depth of field to the reference value or more.

9. The imaging device according to claim 8, wherein said reference value is different in accordance with the focal length of said taking lens.

10. An imaging device comprising:

an image sensor for taking a subject;

a taking lens disposed at a subject side of said image sensor to form a subject image on said image sensor, said taking lens having a stop for regulating a subject-light amount and a focus lens used for focus adjustment, and said taking lens including a zoom lens capable of changing a focal length;

a face detector for detecting a human face from said subject image;

a first subject-distance calculator for calculating a first subject distance on the basis of the focal length of said taking lens and a size of the human face detected by said face detector;

a focus adjuster for moving said focus lens in accordance with said first subject distance;

a depth-of-field calculator for calculating a depth of field on the basis of the focal length of said taking lens, a dimension of said stop and said first subject distance;

a depth-of-field analyzer for judging whether or not a calculated value of said depth of field has a predetermined depth;

a depth-of-field adjuster for reducing said stop to deepen said depth of field when it has been judged that the calculated value does not have the predetermined depth;

a second subject-distance calculator for calculating a second subject distance by triangular ranging; and a distance analyzer for judging whether or not a difference between said first and second subject distances is within a predetermined range, wherein said focus adjuster performs the focus adjustment in accordance with the first subject distance when it has been judged that the difference of said first and second subject distances is within the predetermined range, and said focus adjuster performs the focus adjustment in accordance with the second subject distance when it has been judged that the difference of said first and second subject distances is outside the predetermined range.

11. The imaging device according to claim 10, further comprising:

an infrared diode for emitting infrared rays toward said subject; and a position detecting sensor for receiving the infrared rays reflected by said subject to detect a light reception position thereof.

* * * * *